(12) United States Patent
Wood et al.

(10) Patent No.: US 8,070,096 B2
(45) Date of Patent: Dec. 6, 2011

(54) SYSTEMS AND METHODS FOR RECOVERING AN AIRSHIP

(75) Inventors: Wilfred L. Wood, Canyon Country, CA (US); Timothy W. Blunck, Rosamond, CA (US); David E. Carlile, Quartz Hill, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 664 days.

(21) Appl. No.: 12/191,152

(22) Filed: Aug. 13, 2008

(65) Prior Publication Data

US 2010/0038481 A1    Feb. 18, 2010

(51) Int. Cl.
*B64C 1/12* (2006.01)
(52) U.S. Cl. ............... 244/116; 244/115; 244/110 E
(58) Field of Classification Search .......... 244/115, 244/116, 138 R, 139, 110 E, 63, 96
See application file for complete search history.

(56) References Cited

U.S. PATENT DOCUMENTS

| | | | | |
|---|---|---|---|---|
| 1,373,343 A | * | 3/1921 | Masterman | 244/115 |
| 2,101,399 A | * | 12/1937 | Larsen | 244/17.17 |
| 3,116,897 A | * | 1/1964 | Theed | 244/17.17 |
| 4,174,081 A | * | 11/1979 | Sardanowsky | 244/115 |
| 4,238,095 A | * | 12/1980 | Slater | 244/115 |
| 4,272,042 A | * | 6/1981 | Slater | 244/115 |
| 4,402,479 A | * | 9/1983 | Phipps et al. | 244/116 |
| 4,421,286 A | * | 12/1983 | Laky et al. | 244/116 |
| 5,176,341 A | * | 1/1993 | Ishikawa et al. | 244/116 |
| 6,648,272 B1 | * | 11/2003 | Kothmann | 244/30 |
| 7,040,572 B2 | * | 5/2006 | Munk | 244/30 |

* cited by examiner

*Primary Examiner* — Timothy D Collins
*Assistant Examiner* — Steven Hawk
(74) *Attorney, Agent, or Firm* — McDermott Will & Emery LLP (57) ABSTRACT

An airship recovery system is disclosed including a first cushion pad configured to create a suction force on an outer portion of the airship to capture the airship during landing. An arm is coupled to the first cushion pad and movable between at least two different vertical positions. In an embodiment the air is movable in multiple degrees of freedom. An actuator device is coupled to move the arm. A sensor device is incorporated to detect the location of the airship relative to the recovery system. A controller is utilized to receive signals from the sensor device regarding the location of the airship and output command signals to the actuator to move the arm and the first cushion pad toward a desired contact location on the airship.

24 Claims, 7 Drawing Sheets

SYSTEMS AND METHODS FOR RECOVERING AN AIRSHIP

BACKGROUND

An airship may be lighter than air or heavier than air. Certain airships may land, or be recovered, by dropping tethers. The tethers can be recovered by a ground crew. The ground crew may use a mechanical means such as a winch attached to the tether to assist recovery of the airship. The airship may be released, or launched, by gradually releasing a tether or by releasing multiple tethers.

Alternately, an airship may be recovered using a truck or vehicle mounted mast. A mast may be thought of as analogous to a pier used to moor a ship during shore-based operations, such as loading and unloading, or refueling. The mast may provide stability during ground operations such as loading, unloading, or refueling. The mast may be used in conjunction with one or more tethers which are analogous to mooring lines for a ship. As with recovery, release or launch is accomplished by gradually releasing one or more tethers. Releasing tethers acts to release or launch an airship, as releasing a mooring line launches a ship from a pier.

As with a waterborne ship, control of an airship during landing requires stability. A pier for a ship provides some additional stability. Similarly, a mast can provide only a degree of additional stability to an airship. Further increasing external control can provide increased stability while recovering the airship. Similar advantages may also be achieved in increased stability when the airship is released, or launched.

Airships are currently being developed that combine advantages of an aerodynamic shape with the cargo capacity, simplicity, and low operating costs. Uses for such airships include cargo transport, telecommunications platforms, surveillance, emergency response, advertising platforms, and tourism, among others. Airships may be slow and difficult to maneuver. Yet, it is desirable to provide capability that allows an airship to take off and land in a minimum amount of space and in a variety of locations.

SUMMARY

An airship recovery system is disclosed including a first cushion pad configured to create a suction force on an outer portion of the airship to capture the airship during landing. An arm is coupled to the first cushion pad and movable between at least two different vertical positions. In an embodiment the air is movable in multiple degrees of freedom. An actuator device is coupled to move the arm. A sensor device is incorporated to detect the location of the airship relative to the recovery system. A controller is utilized to receive signals from the sensor device regarding the location of the airship and output command signals to the actuator to move the arm and the first cushion pad toward a desired contact location on the airship.

In other embodiments, a method of recovering an airship is disclosed including sensing the location of the airship relative to a first cushion pad; moving an arm to position the first cushion pad in a predetermined position; and creating a suction force on the cushion pad. The method further includes sensing whether a seal between the airship and the cushion pad is established; retaining the airship on the cushion pad with the suction force; and releasing the airship by removing the suction force.

BRIEF DESCRIPTION OF THE DRAWINGS

Embodiments disclosed herein may be better understood, and their numerous objects, features, and advantages made apparent to those skilled in the art by referencing the accompanying drawings. The use of the same reference symbols in different drawings indicates similar or identical items.

DETAILED DESCRIPTION OF THE DRAWINGS

Figure 1A:
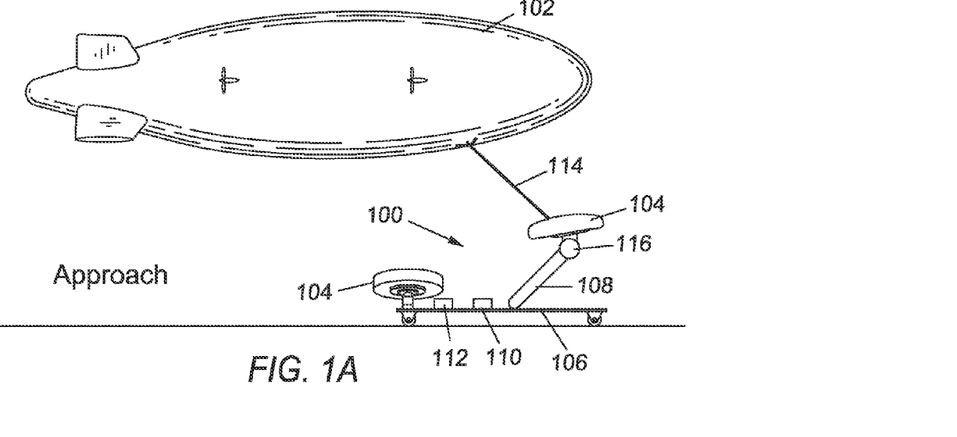
FIGS. 1A-1C show side views of an embodiment of a recovery system in different operational modes with respect to an airship including approach, capture, and secure modes in accordance with aspects of the invention.
Figure 1B:
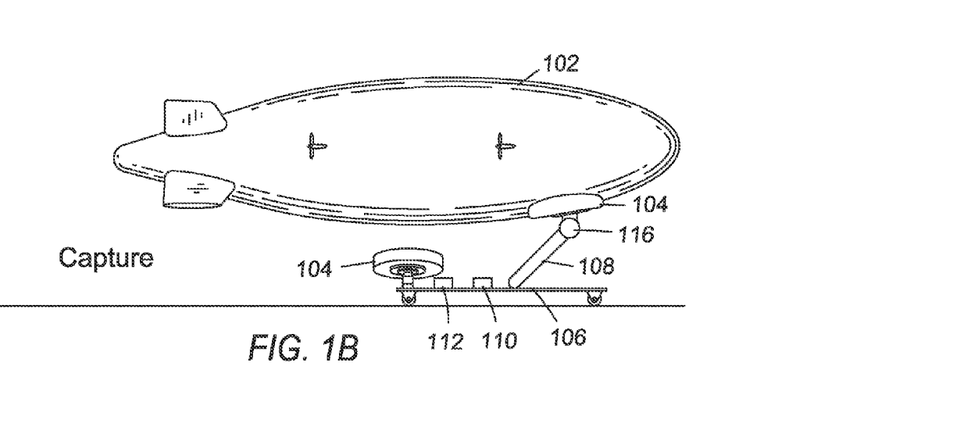
Figure 1C:
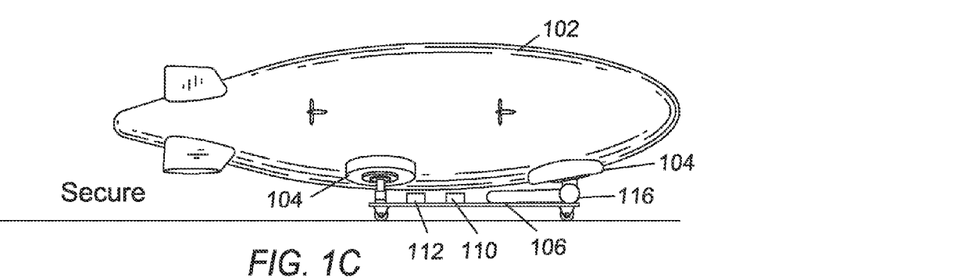

A system, method and an apparatus to recover and release airships such as lighter-than-air and hybrid airship are disclosed. Referring to FIGS. 1A-1C, side views of an embodiment of the recovery system 100 is shown in different operational modes with respect to an airship 102 including approach, capture, and secure modes. During approach mode, recovery system 100 can operate to move at least one cushion pad 104 into position to intercept airship 102. For example, cushion pad 104 can be coupled to frame 106 using a movable arm 108. Arm 108 is movable between at least two different vertical positions. In an embodiment, arm 108 is moveable in multiple degrees of freedom including extension, rotation about the vertical axis. For example, arm 108 may be raised toward airship 102 during approach and capture modes. Arm 108 may be lowered toward frame 106 during secure mode to allow airship 102 to come to rest on additional cushion pads 104. In an embodiment arm 108 may also be extended and retracted. An actuator device (not shown) can be coupled to move the arm 108 between raised and lowered positions.

A sensor device or system (not shown) can be positioned on or near frame 106 and configured to detect the location and other relevant information regarding airship 102. The sensor systems such as a Ground Positioning Satellite ("GPS") system, infra red detection system, laser system, radar system, or other suitable sensor means may be used. An automated controller 110 can be included with recovery system 100 to receive signals from the sensor system regarding airship 102 and output command signals to the actuator device to move the arm 108 toward the airship 102 during approach mode. The actuator can be driven electronically, pneumatically, hydraulically, mechanically, and/or by other suitable means.

Recovery system 100 can also include one or more suction force generators, such as suction pump 112 that is configured to intake atmospheric air and create a suction force between cushion pads 104 and an outer portion of airship 102 to capture and secure airship 102 to frame 106. Bidirectional fans may also be used in addition to the suction pumps. Blow out panels may be provided to prevent over pressure during recovery.

Accordingly, the sensor system and/or suction pump 112 may be configured to provide signals that indicate when airship 102 is secured by recovery system 100, such as the presence of a stable suction force between cushion pads 104 and airship 102. The signals may be used by controller 110 to provide visual, audio, or other suitable cues to an operator when airship 102 is secure, or becomes unsecured for some reason such as loss of pressure/suction force.

One way to guide airship 102 toward recovery system 100 during approach mode is to drop a tether 114 from the airship 102 toward recovery system 100. Ground crew can attach tether 104 to a winch 116 on recovery system 100. Winch 116 can be positioned and operated manually or under direction from controller 110 to reel in tether 114 and draw airship 102 toward recovery system 100. In the embodiment shown in FIG. 1A, winch 116 is positioned on arm 108 below cushion pad 104. Winch 116 can be positioned in other suitable locations, such as on the ground, the frame 106, or a transport vehicle. Additionally, two or more tethers 114 and winches 116 may be used for more rapid and/or stable recovery. Tether 114 can be routed through an opening in cushion pad 104 and attached to winch 116. Such a configuration is useful when tether 114 is attached on or near an area of airship 102 that is intended to be positioned on cushion pads 104.

Figure 2:
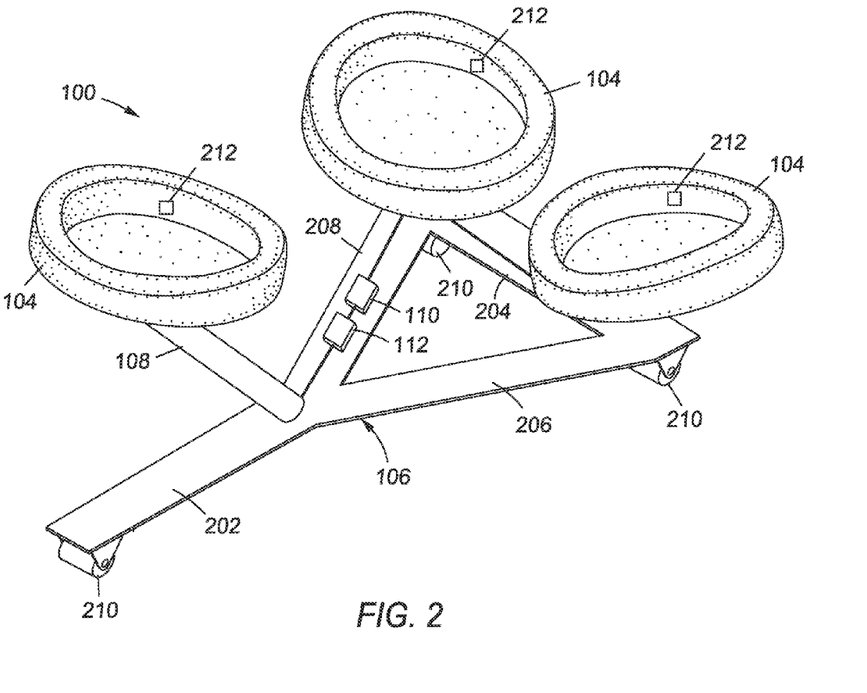
FIG. 2 shows a perspective view of the recovery system of FIGS. 1A-1C.

FIG. 2 shows a perspective view of an embodiment of recovery system 100 including three cushion pads 104 arranged in a triangular shape around frame 106. Viewed from the top or bottom perspective, frame 106 is the support structure for the suction pads. The structure is depicted in FIG. 2 is Y-shaped. However as discussed further below the structure may be of other shapes capable of supporting the loads generated in the recovery activity and providing the necessary stability for the airship. One end of arm 108 is coupled to the center of frame 106 and extends along the lower leg 202 of the Y-shaped frame. A reinforcing bar 204 can be included between the upper ends 206, 208 of the Y-shaped frame.

Frame 106 may be built-in or attached to the ground, or attached to a transport device such as a truck, boat, railcar, or other suitable mode of transportation for portability. In an embodiment, the transport vehicle may be a tug or similar vehicle. In other embodiments, wheels 210 can be mounted to frame 106 to enable frame 106 to be moved to different locations with or without airship 102. Wheels 210 may be attached to the frame 106 in staggered positions, such as under cushion pads 104 to stabilize frame 106 during movement. Wheels 210 can be used to rotate, translate or relocate the frame during recovery of the air, release of the airship, loading, unloading refueling or other ground operations. The ability to relocate recovery system 100 allows greater freedom and flexibility for the ground crew during ground operations, and to provide a landing site for airship 102 in a variety of locations that might not otherwise be feasible.

Note that frame 106 can have other suitable shapes, such as an A-shape, a triangular shape, an oval shape, a round shape, a rectangular shape, etc. At least three cushions pads 104 arranged in a triangle are typically included in recovery system 100, however any suitable number and configuration of cushions pads 104 can be used. In some embodiments, two or more cushion pads 104 may be connected to a movable arm 108, and arm 108 connected to respective locations on frame 106.

Figure 3:
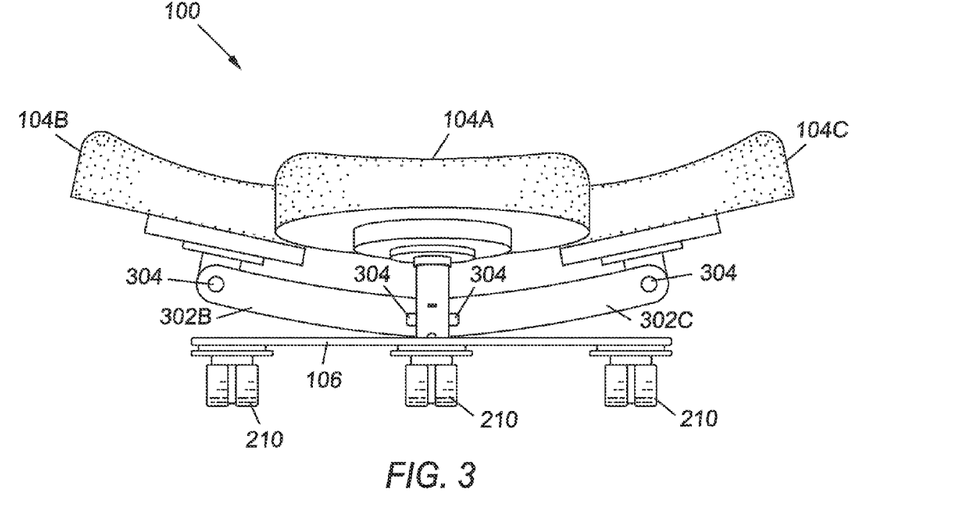
FIG. 3 shows a front view of the recovery system of FIGS. 1A-1C.

The hull of airship 102 (FIG. 1A) can be rounded about the longitudinal, lateral, and vertical axes. Accordingly, components of recovery system 100 can be configured to enable the surface of cushion pads 104 to move and adapt to the attitude and shape of the rounded hull to establish a more effective seal between cushion pads 104 and airship 102 during recovery or prior to launch. Referring to FIG. 3, the second and third cushion pads 104B, and 104C would be attached to frame 106 by arms 302B and 302C. Arms 302B and 302C have motion and actuation characteristics similar to the forward arm 108. Arms 302B, and 302C can be configured to allow motion with respect to frame 106 in multiple degrees of freedom, including rotation about their vertical axis as well as extension and retraction, in order to enable cushion pads 104B, 104C to conform to and establish a seal with the rounded outer surface of airship 102. The range of motion of arms 302B, 302C can also support airship 102 as airship 102 is recovered and settles onto cushion pads 104. Arms 302B, and 302C may flex, or respond dynamically via an active response control system, as the inertia of airship 102 shifts to cushion pads 104.

Pivot couplings 304 may be used to attach cushion pads 104B, 104C to respective ends of arms 302B, 302C to further enable cushion pads 104B, 104C to conform to the attitude and shape of airship 102. As a further example, referring to FIGS. 3 and 4, the upper surfaces of cushion pads 104 can include a circular disk forming a cushion rim 402 around a substantially solid disk 404. The contour of the cushion rims 402 can be configured to conform to the rounded shape of airship 102. Note that other mechanisms can be used to provide flexible positioning of cushion pads 302B, 302C and establish a seal between cushion pads 104 and airship 102 in addition to or instead of contoured rims 402, pivot couplings 304, and arms 302B, 302C.

Figure 4:
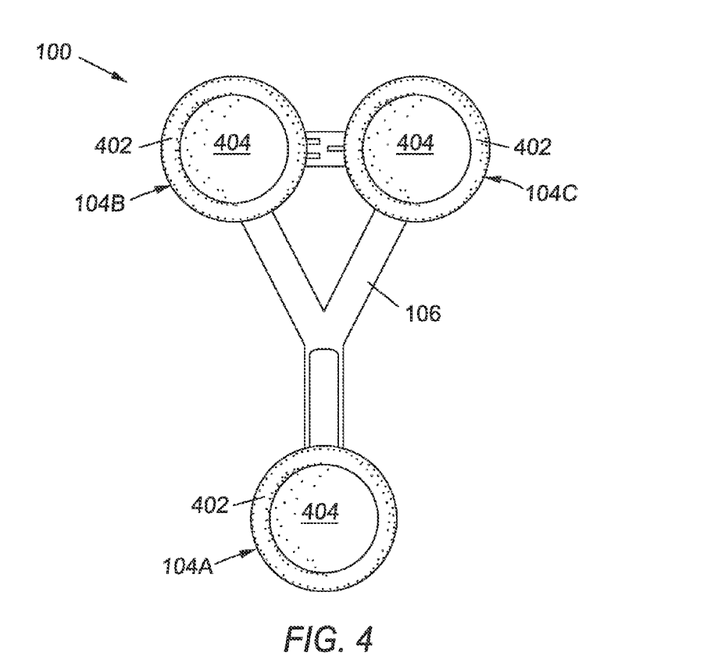
FIG. 4 shows a top view of the recovery system of FIGS. 1A-1C

Cushion pad 104 is typically sized to achieve the suction force desired between cushion pad 104 and the outer surface of airship 102. To achieve a desired force a designer may increase the area of cushion pads 104 as well as adjust the amount of differential pressure. The suction force and size of cushion pads 104 can be configured to provide the desired level of stability during various phases of recovering/releasing airship 102. The size of cushion pads 104 is typically selected based on the size and weight of airships 102 to be recovered Cushion rim 402 can be fabricated using a flexible material formed to provide a pressurized plenum made of a flexible material such as rubber, plastic, nylon or neoprene. The flexible material may be stiffened sufficiently to create a more solid seal. Other materials, such as gasket material or composites may also be used.

Cushion pad including a circular disk with a cushion rim 512 can be manufactured from a material selected for the material's ability to form a seal. Gas seals may be created when a flexible material is used, such; rubber, neoprene, nylon or plastic. Alternately, other materials such as composites and gasket materials may be used.

One or more valves 212 can be included in recovery system 100 to control the suction force exerted by cushion pads 104. Valves 212 can further operate between open and closed positions to adjust the differential pressure and the force applied to the surface of airship 102. A pressure sensor (not shown) can be integrated with or positioned near valves 212 and configured to sense a differential pressure or suction force being exerted by cushion pads 104. Signals from the pressure sensor can be provided to controller 110, which outputs signals to adjust the position of valves 212 as required. Note that those portions of the surface area of airship 102 designed to mate with the suction pads may be reinforced in the vicinity of cushion pads 104 to improve durability and provide a suitable surface for application of the suction force.

Figure 5A:
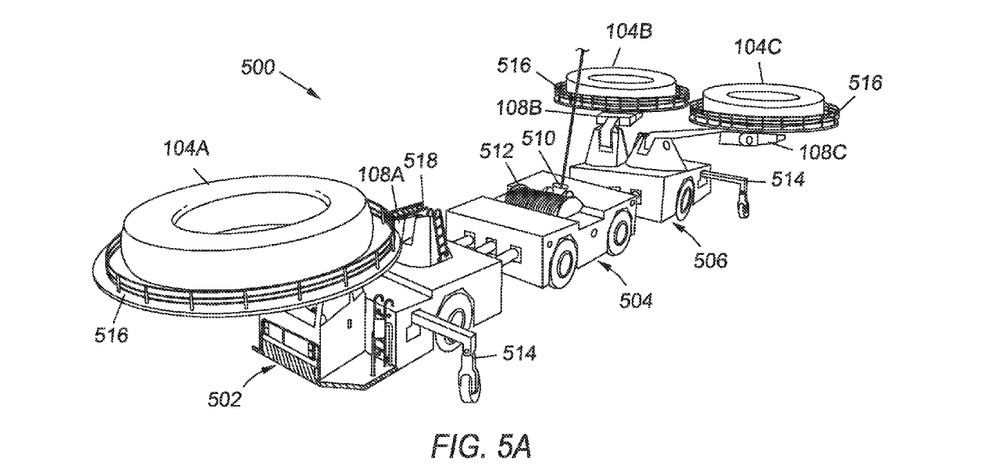
FIGS. 5A-5C depict another embodiment of an airship recovery system.
Figure 5B:
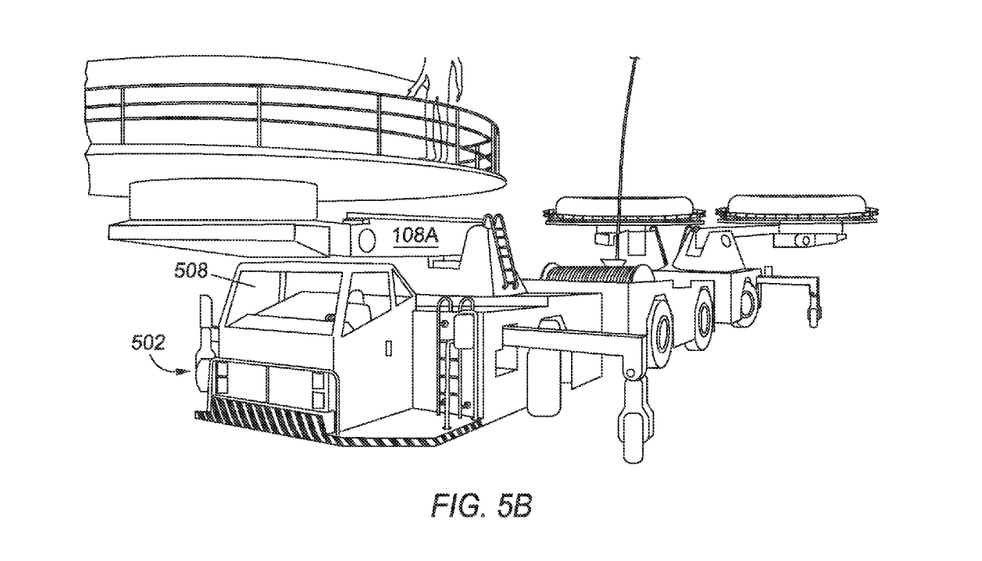
Figure 5C:
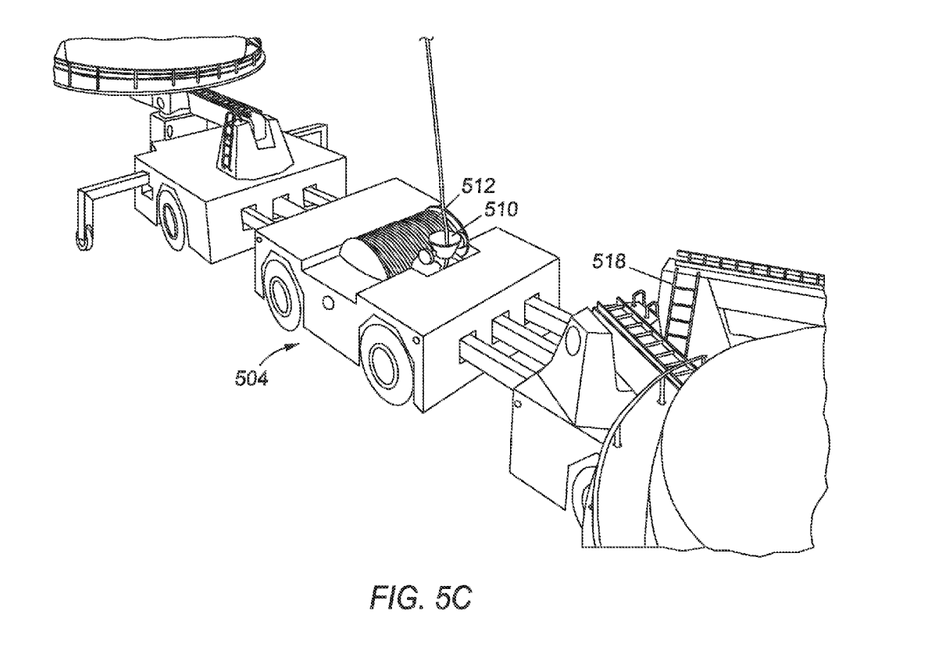

Referring to FIGS. 5A, 5B and 5C a perspective view of another embodiment of a recovery system 500 is shown including three segments or modules 502, 504, 506 coupled in linear fashion, i.e., one end of module 502 is coupled to one end of module 504. Another end of module 504 is couple to one end of module 506. Modules 502-506 may be disconnected, with connections between modules 502-506 including mechanical coupling devices as well as electronic connections for data and command signals to operate components on modules 502-506. Modules 502-506 and components on modules 502-506 can be operated manually, automatically, and/or remotely.

As shown more clearly in FIG. 5B, module 502 can include an operator station 508 with a steering wheel, engine, brakes, accelerator, and controls and/or interface for operating components of recovery system 500. Modules 502 and 506 can include cushion pads 104 coupled to articulating arms 108. Articulating arms 108 can be extended, retracted, elevated, lowered, and rotated to place cushion pads 104 in position for recovering an airship 102 (FIGS. 1A-1C). In the embodiment shown, module 502 includes one cushion pad 104A and module 506 includes two cushion pads 104B, 104C.

Module 504 can include winch module 510 and a roll of tether cable 512 that can be attached to reel an airship toward recovery system 500. As best shown in FIG. 5C, winch module 510 can include a funnel portion to guide cable 512 as the cable 512 is being reeled out and in.

Modules 502-506 can be configured with wheels to locate recovery system 500 to a desired location. Module 502 can include an engine and drive train to drive the wheels on at least one of modules 502-506. Outrigger wheels 514 can be attached to supports extending from the sides of modules 502 and 506 to stabilize modules 502, 506, particularly when an airship is docked on recovery system 500.

Cushion pads 104 can be mounted on circular platforms 516 that are larger in diameter than cushion pads 104 to provide a walkway around cushion pads 104. One or more ladders 518 can be provided on modules 502-506 to access cushion pads 104 on platforms 516 as well as to access a door or other passageway to the inner portion of an airship.

Figure 6:
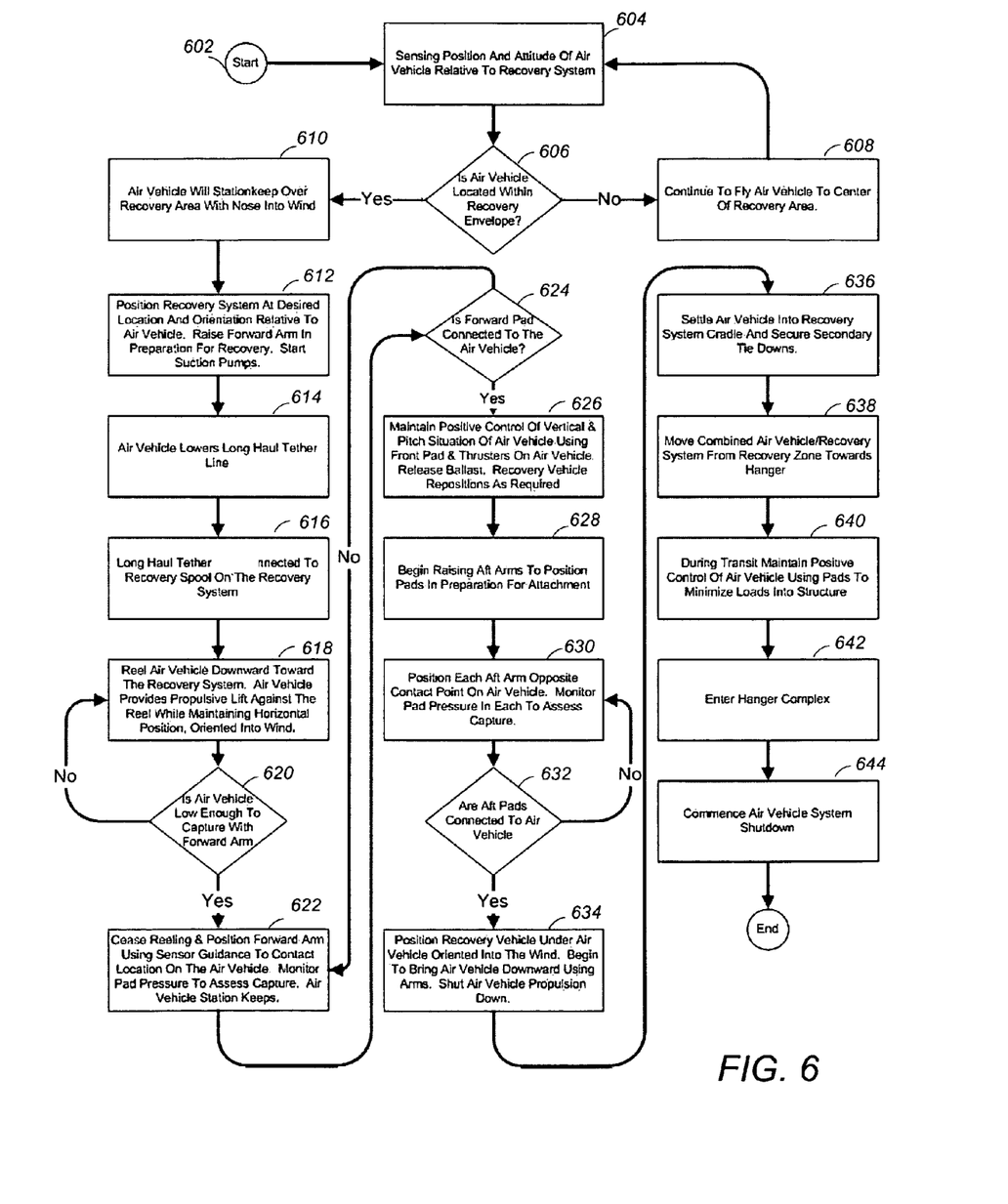
FIG. 6 shows a flow diagram of an embodiment of processes that can be performed by the recovery systems of FIGS. 1A and 5A-5C.

Referring to FIG. 6, a process 600 of recovering an airship using recovery systems 100, 500 (FIGS. 1 and 5A-5C) is shown. Process 602 starts the sequence and may include initializing relevant parameters and variables. Process 604 can include sensing the location of an airship relative to the recovery system. The position of the airship relative to a first cushion pad can be determined. The airship may approach the cushion pad under its own power and controls, or by guidance supplied by the recovery system. For example, the recovery system can supply a guidance signal to a sensor device or a receiver on the airship. The airship may include a control system that guides the airship toward the recovery system based on the guidance signal.

Process 606 determines if the airship is located within a recovery envelop, which can be defined as being within a predefined distance from the recovery system, such as height or altitude, latitude, and longitude of a particular location on recovery system relative to the airship. Information regarding the recovery envelop can be provided to the airship as well as the recovery system. If the airship is not within the recovery envelop, the airship continues to fly to the center of the recovery area in process 608. If the airship is within the recovery envelop, the airship will maintain position, or station keep, within the recovery envelop in process 610. The airship may maintain its nose into the wind to provide more stability.

In process 612, the recovery system can be positioned in a desired location and orientation relative to the airship. An automated control system and controller can be included in recovery system to receive information regarding the position of the airship, and move the arm toward the airship. Process 612 can further include raising an articulating arm toward the airship and starting suction pumps to produce a vacuum on the cushion pad(s) in preparation for contact with the airship. The recovery system can includes a suction force generator, such as a compressor and valves, coupled to the cushion pads. The automated control system and controller can be configured to receive information regarding the suction force being exerted by the cushion pads, and to adjust the suction generation and pressure release valves to achieve the desired suction pressure or force. The articulating arm can be coupled to an actuator that may be operated electrically, hydraulically, pneumatically, mechanically, and/or by other means to facilitate movement of the cushion pad toward the airship.

In process 614 the airship can lower a long haul tether line. In process 616 the long haul tether line can be connected to the tether cable and winch in the recovery system. In process 618 the recovery system reels the airship downward toward the recovery system. The airship can provide propulsive lift against the reel while maintaining horizontal position and nose into the wind.

Process 620 can determine whether the airship is low enough to capture with the forward arm of the recovery system. If the airship is not low enough, the recovery system continues to reel in the tether cable until the airship is low enough to capture with the forward arm. When the airship is low enough process 622 ceases reeling the tether cable and the forward arm is positioned using sensor guidance to position the forward arm to contact a pre-determined position on the airship. The recovery system can monitor pad suction pressure to determine when the airship contacts and is captured by the cushion pad. The airship can continue station keeping until capture is complete.

Process 624 determines whether suction has been established between the forward pad and the airship. If suction has not been established, control transitions back to process 622, otherwise, control transitions to process 626 to maintain positive control of the vertical and pitch attitude of the airship using the front cushion pad and thrusters on the airship. The recovery system may be re-positioned as required to facilitate recovery and ballast may be released from the airship to allow the airship to settle onto the cushion pad(s).

In process 628, the aft articulating arms can begin raising to position pads in preparation for contact with the airship. In process 630 each aft arm is positioned opposite a contact point on the airship. The pressure of the pads is monitored to assess capture of the airship. In some embodiments, a sensor is configured to provide a signal indicating the pressure or force being exerted on the airship by the cushion pad to determine when sufficient suction force has been established between the cushion pads and the airship.

Process 632 determines whether sufficient suction has been established between the aft cushion pads and the airship. A seal is determined to be established when the pressure or force being sensed is at a predetermined level. If a seal or connection is not established between the aft cushion pads and the airship, control transitions back to process 630. If sufficient suction has been established, control transitions to process 634 to position the recovery system under the airship and position the airship into the wind, as required. The airship is lowered using cushion pads and arms and the airship propulsion system may be shut down.

During process 636 the airship settles into place in the recovery system and secondary tie downs can be used to secure the airship. Process 638 moves the combined airship and recovery system from the recovery zone towards a hangar. During transit, position control of the airship is maintained using the cushion pads in process 640. Loads onto the recovery system from the weight of the airship may be minimized by use of the cushion pads. During process 642 the airship and airship recovery system enter the hangar complex. During process 644 the airship system begins shutdown.

Figure 7:
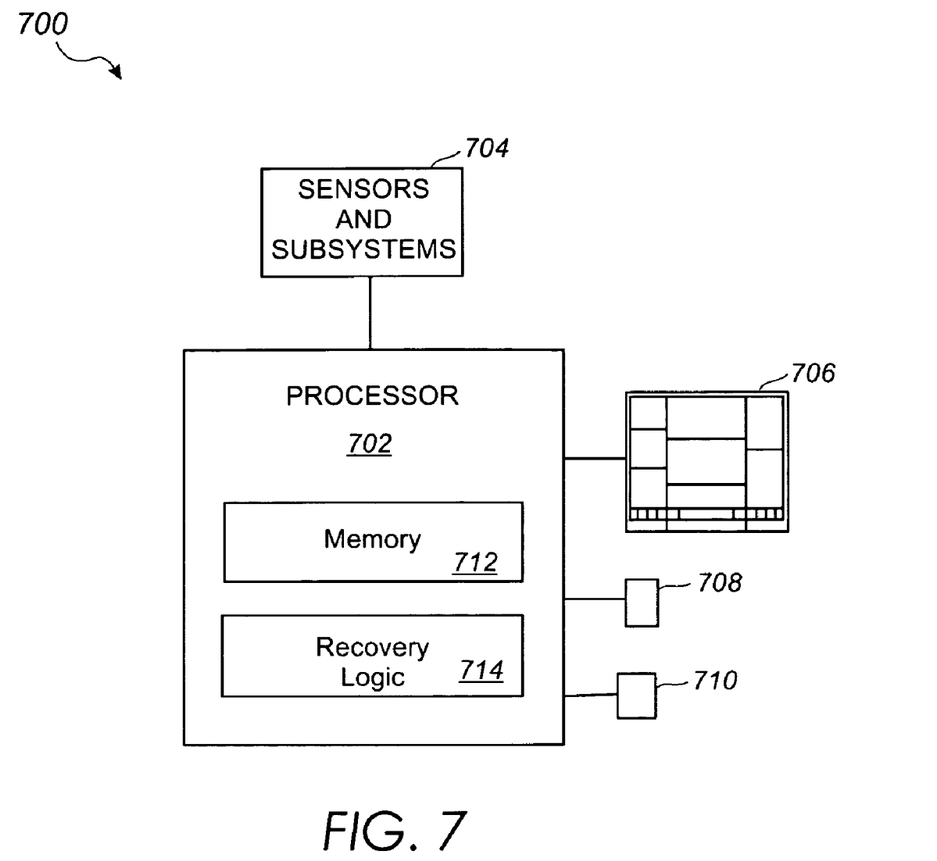
FIG. 7 is a block diagram of an embodiment of a sensor system and processing system configured to control various components of the recovery systems of FIGS. 1A and 5A-5C.

Referring to FIG. 7, a block diagram of a processing system 700 that can be included in recovery systems 100, 500 (FIGS. 1 and 5A-5C) is shown. System 700 can include one or more processors 702, subsystems and sensors 704, user display device 706, cushion pad control device(s) 708, winch control device 710, and other suitable components. Processor 702 can be any suitable computer-processing device that includes memory 712 for storing and executing logic instructions, such as recovery logic instructions 714 that implement various features of recovery process 600 (FIG. 6). Processor 702 can interface with various input/output devices, such as user display device 706, cushion pad control device(s) 708, winch control device 710, a keyboard, touchscreen, buttons, knobs, switches, and/or other suitable input/output devices that allow a user to interact with components internal and external to processor 702.

Additionally in processor 702 can be embodied in any suitable computing device, and so include embedded computers, desktop computers, laptop computers, or other suitable computing devices. Processor 702 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

Logic instructions 714 executed by processor 702 can be stored in memory device 712, on computer readable medium, or accessed by processor 702 in the form of electronic signals. Processor 702 can be configured to interface with other processors, and to connect to an external network via a suitable communication link such as any one or combination of T1, ISDN, or cable line, a wireless connection through a cellular or satellite network, or a local data transport system such as Ethernet or token ring over a local area network.

Subsystems and sensors 704 can include components and corresponding sensors for electrical, pneumatic, fuel, and hydraulic systems on recovery systems 100, 500; actuators for moving the articulating arms and winch; and RADAR, infrared, and/or other suitable sensors for detecting the location, orientation, and/or speed of arriving and departing airships. Subsystems can further include a communication link to send and receive information between recovery system 100, 500 and the airships. The information can include data from sensors onboard the airships as well as any other suitable information that can be used to operate recovery systems 100, 500 manually or automatically, as well as for other purposes. Sensors can provide information about the operational state of an airship and recovery systems 100, 500 to processor 702. Sensors can provide information regarding operational status of recovery system 100, 500, such as electrical systems, engine, throttle position, fuel system, air cushion pads 104, and a hydraulics system. Processor 702 can execute logic to determine whether operational modes requested by the crewmembers are permitted based on the current mode of the components, as well as to implement various features of process 600 (FIG. 6). Control commands can be output from processor 702 to control operational modes of various subsystems and sensors. Redundant subsystems and sensors 704, and processors 702, can also be included to provide parallel processing capabilities and improve reliability.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. An airship recovery system comprising:
   a first cushion pad configured to apply a suction force to an outer portion of a hull of an airship;
   a selectively movable arm; and
   a pivot device coupled between the first cushion pad and a first end of the arm, the pivot device configured to allow the first cushion pad to rotate about at least one horizontal axis with respect to the arm.

2. The system according to claim 1, further comprising:
   a frame coupled to a second end of the arm;
   an actuator coupled between the arm and the frame, the actuator configured to receive a command signal and move the arm in response to the received signal;
   a sensor configured to detect the location of the airship relative to the system and provide a signal comprising information regarding the location of the airship; and
   a controller coupled to the actuator and the sensor, the controller configured to receive the signal from the sensor and provide the command signal to the actuator so as to move the first cushion pad toward a desired contact location on the hull of the airship.

3. The system according to claim 2, wherein the sensor comprises a sensor element selected from the group consisting of: Ground Positioning Satellite (GPS), radar, laser, and infrared.

4. The system according to claim 2, further comprising:
   a transmitter coupled to the controller, the transmitter operable to transmit signals to the airship regarding the position of the first cushion pad during an approach mode.

5. The system according to claim 2, further comprising:
   at least one second cushion pad; and
   at least one lever, wherein the at least one lever is coupled at a first end to the at least one second cushion pad and coupled at a second end to the frame.

6. The system according to claim 5, wherein the at least one second cushion pad is configured to apply a suction force to the hull of the airship.

7. The system according to claim 6, further comprising:
   at least one wheel coupled to the frame to allow the frame to move from a first location to a second location.

8. The system according to claim 6, wherein:
   the at least one second cushion pad comprises a second cushion pad and a third cushion pad;
   the at least one lever comprises a second lever coupled to the frame at a second end and the second cushion pad at a first end and
   a third lever coupled to the frame at a second end and the third cushion pad at a first end.

9. The system according to claim 1, wherein the first cushion pad comprises:
   a circular disk coupled to the pivot device; and
   a cushion rim coupled to the circular disk, the cushion rim configured to conform substantially to the outer surface of the airship.

10. The system according to claim 7, further comprising:
    a first module comprising the first cushion pad;
    a second module
    comprising the at least one second cushion pad; and an engine configured to move the system to a desired location.

11. The system according to claim 1 comprising:
a valve coupled to the first cushion pad, the valve operable to receive air from the atmosphere to decrease suction force between the first cushion pad and the airship.

12. The system according to claim 10, further comprising:
a winch operable to reel in a tether attached to the airship; and
a third module comprising the winch.

13. A method of recovering an airship, the method comprising the steps of:
creating a suction force on a first cushion pad;
moving the first cushion pad into sealing contact with a hull of an airship; and retaining the airship on the first cushion pad with the suction force.

14. The method according to claim 13 further comprising the step of:
moving the retained airship by moving the first cushion pad so as to bring the hull of the airship into contact with at least one second cushion pad.

15. The method according to claim 14, further comprising the steps of:
creating a suction force on the at least one second cushion pad; and
retaining the airship on the first and the at least one second cushion pads with the suction force.

16. The method according to claim 13, wherein the step of moving the first cushion pad comprises moving an arm that is coupled to the first cushion pad in response to a signal received from a sensor configured to detect a location of the airship.

17. The method according to claim 15, further comprising the step of:
moving the retained airship by moving the first and the at least one second cushion pads from a recovery area to a storage area.

18. An apparatus to recover an airship, the apparatus comprising:
a frame;
a suction force generator;
a first cushion pad coupled to the suction force generator, the first cushion pad configured to apply a suction force to an outer rounded portion of a hull of the airship;
a movable first arm coupled at a first end to the first cushion pad and at a second end to the frame;
a pivot device coupled between the first end of the first arm and the first cushion pad and configured to allow the first cushion pad to move relative to the first arm about a horizontal axis;
an actuator coupled between the first arm and the frame, the actuator configured to receive a command signal and move the first arm in response to the received signal;
a sensor configured to detect the location of the airship relative to the system and provide a signal comprising information regarding the location of the airship; and
a controller coupled to the actuator and the sensor, the controller configured to receive the signal from the sensor and provide the command signal to the actuator so as to move the first cushion pad toward a desired contact location on the hull of the airship.

19. The apparatus according to claim 18, wherein:
the sensor is further configured to detect an approaching airship; and
the controller is configured to automatically provide the command signal to the actuator to move the first cushion pad toward a predetermined reinforced area on the airship.

20. The apparatus according to claim 18, wherein the sensor comprises a sensor element selected from the following group: Ground Positioning Satellite (GPS), radar, laser, and infrared.

21. The apparatus according to claim 18, further comprising:
a second cushion pad;
a third cushion pad;
a second arm coupled to the frame at one end and the second cushion pad at another end; and
a third arm coupled to the frame at one end and the third cushion pad at another end.

22. The apparatus according to claim 21, wherein:
the first, second, and third cushion pads each comprise a circular disk with a cushion rim; and
the cushion rims are configured to conform substantially to the outer rounded portion of the hull of the airship.

23. The apparatus according to claim 21, wherein:
the suction force generator is further coupled to the second and third cushion pads; and
the second and third cushion pads are further configured to apply a suction force to the outer rounded portion of the hull of the airship.

24. The apparatus according to claim 23, further comprising:
means for relocating the frame from a first location to a second location.

* * * * *